United States Patent [19]
Geiger et al.

[11] Patent Number: 5,857,003
[45] Date of Patent: Jan. 5, 1999

[54] DIGITAL RADIO HAVING IMPROVED MODULATION AND DETECTION PROCESSES

[75] Inventors: John A. Geiger; John P. Fischer, both of East Amherst; Michael L. Fetto, Cheektowaga, all of N.Y.

[73] Assignee: Aria Wireless Systems, Inc., Orchard Park, N.Y.

[21] Appl. No.: 572,513

[22] Filed: Dec. 14, 1995

Related U.S. Application Data

[62] Division of Ser. No. 100,626, Jul. 30, 1993, abandoned.

[51] Int. Cl.[6] .................................................. H04L 25/06
[52] U.S. Cl. ........................... 375/319; 375/344; 455/307
[58] Field of Search .................................. 375/285, 317, 375/319, 344, 346, 350; 326/33; 327/532, 554, 555, 558, 559; 329/320; 455/67.3, 296, 307

[56] References Cited

U.S. PATENT DOCUMENTS

| | | | |
|---|---|---|---|
| 5,012,490 | 4/1991 | Myer | 375/285 |
| 5,175,749 | 12/1992 | Ficht et al. | 375/319 |
| 5,388,125 | 2/1995 | Toda et al. | 375/344 |
| 5,487,186 | 1/1996 | Scarpa | 375/344 |

FOREIGN PATENT DOCUMENTS

| | | | |
|---|---|---|---|
| 0120474 | 10/1984 | European Pat. Off. | 375/344 |

*Primary Examiner*—Young T. Tse
*Attorney, Agent, or Firm*—Kellie M. Muffoletto; Ulrich Daman & Morey LLP

[57] ABSTRACT

There is provided a detection process for a digital radio which receives a multistate baseband signal comprising removing the low frequency information content of the baseband signal and subsequently restoring the low frequency information content to provide a conditioned baseband signal for detection so as to provide automatic frequency control for the radio on a manner avoiding loss of the low frequency information content of the baseband signal. This is accomplished by removing the low frequency information content of the baseband signal by high pass filtering to provide a filtered baseband signal, decoding the filtered baseband signal to provide decoded information signals in digital form, converting the decoded digital information signals to analog information signals, low pass filtering the analog information signals to recover the low frequency information content and adding the low pass filtered analog signal to the baseband signal to provide a conditioned baseband signal for detection wherein the conditioned baseband signal contains the low frequency information content.

4 Claims, 11 Drawing Sheets

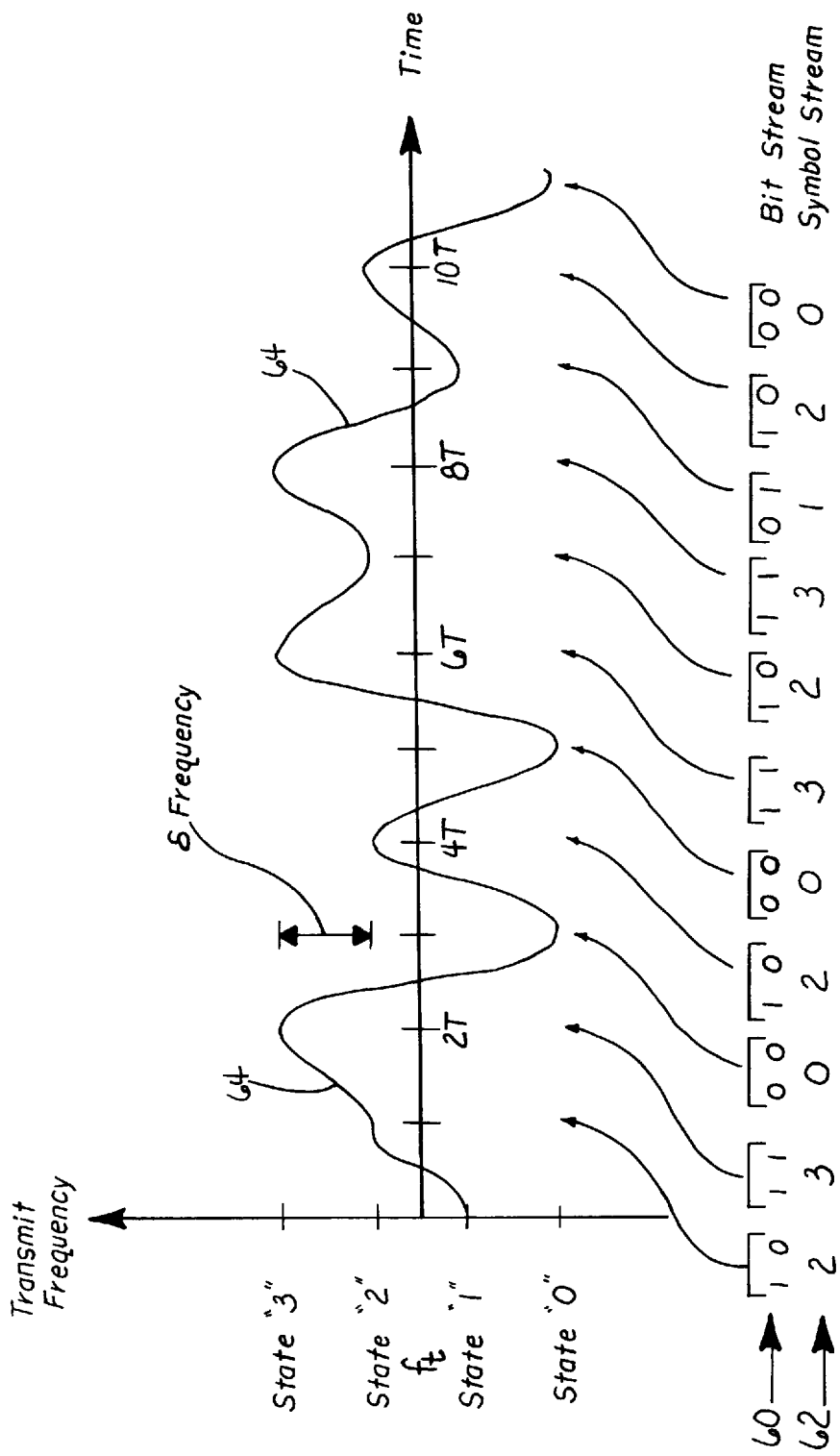
Fig. 2 Relationship Between Bit Stream, Symbol Stream, and Transmitted Waveform

DIGITAL RADIO HAVING IMPROVED MODULATION AND DETECTION PROCESSES

CROSS REFERENCE TO A RELATED APPLICATION

This application is a division of application Ser. No. 08/100,626 filed Jul. 30, 1993 and now abandoned.

BACKGROUND OF THE INVENTION

This invention relates to the art of digital data radio frequency communication, and more particularly to new and improved modulation and detection processes for digital radio communication.

One area of use of the present invention is in a radio transceiver employed in a metropolitan area communications network, although the principles of the present invention can be variously applied. Direct digital synthesizers and phase lock loops have been employed in the generation of frequency modulated transmission signals. In a multi-state frequency shift key modulation scheme, a potential problem exists in that transitions between frequency states can be abrupt causing undesirable spectral splatter. In the reception of such signals, a drawback of the typically fast-acting automatic frequency control circuit is the potential loss of low frequency data.

It would, therefore, be highly desirable to provide a digital data radio frequency modulation process and apparatus wherein the reference signal transitions smoothly from one state to another. It would also be highly desirable to provide an automatic frequency control for a digital radio wherein carrier frequency errors are removed and the information is detected in a simple yet highly effective manner.

SUMMARY OF THE INVENTION

It is, therefore, a primary object of this invention to provide a new and improved digital data radio apparatus and method.

It is a further object of this invention to provide a digital data radio angle, i.e. frequency, modulation process and apparatus wherein the reference signal transitions smoothly from one state to another.

It is a more particular object of this invention to avoid spectral splatter in transitions between states in a multi-state angle, i.e. frequency, modulation scheme in a digital data radio.

It is a further object of this invention to provide a precisely digitally controlled phase modulation process which allows easy multi-state modulation and precise control of the signal spectrum.

It is a further object of this invention to provide an automatic frequency control for a digital radio wherein carrier frequency errors are removed to enhance digital signal recovery.

It is a further object of this invention to provide such a digital data radio which allows an increased data rate for a fixed radio frequency bandwidth.

It is a further object of this invention to provide such a digital radio having a minimum signal acquisition time.

It is a more particular object of this invention to reduce the error rate due to frequency differences and other slowly varying parameters which differ between the transmitting and receiving digital data radios.

It is a further object of this invention to provide the foregoing in a manner which minimizes the use of high tolerance components.

It is a further object of this invention to provide the foregoing in a digital data radio which is compatible with pre-existing digital data communication network apparatus.

The present invention provides a multistate angle modulation process for a digital radio including a reference generator for provide a reference signal which transitions from one state to another wherein the times between transitions are designated symbol times, the process comprising providing a series of commands in the form of small steps approximating a time continuous transition, for example a sinusoidal transition, to the next desired state to the reference generator during each symbol time so that the reference signal transitions smoothly from one state to another in a manner approximating a time continuous function, for example a raised cosine. The angle modulation can comprise frequency modulation or phase modulation. The reference generator can comprise a direct digital synthesizer wherein the providing a series of commands comprises changing the phase increment value of the direct digital synthesizer. There is also provided a detection process for a digital radio which receives a multistate baseband signal comprising removing the low frequency information content of the baseband signal and subsequently restoring the low frequency information content to provide a conditioned baseband signal for detection so as to provide automatic frequency control for the radio in a manner avoiding loss of the low frequency information content of the baseband signal. This is accomplished by removing the low frequency information content of the baseband signal by high pass filtering to provide a filtered baseband signal, decoding the filtered baseband signal to provide decoded information signals in digital form, converting the decoded digital information signals to analog information signals, low pass filtering the analog information signals to recover the low frequency information content and adding the low pass filtered analog signal to the baseband signal to provide a conditioned baseband signal for detection wherein the conditioned baseband signal contains the low frequency information content.

The foregoing and additional advantages and characterizing features of the present invention will become clearly apparent upon a reading of the ensuing detailed description together with the included drawing wherein:

BRIEF DESCRIPTION OF THE DRAWING FIGURES

FIG. 2 is a graph including a waveform illustrating the frequency modulated signal transmitted by the radio of FIG. 1;

DETAILED DESCRIPTION OF THE ILLUSTRATED EMBODIMENT

Figure 1:
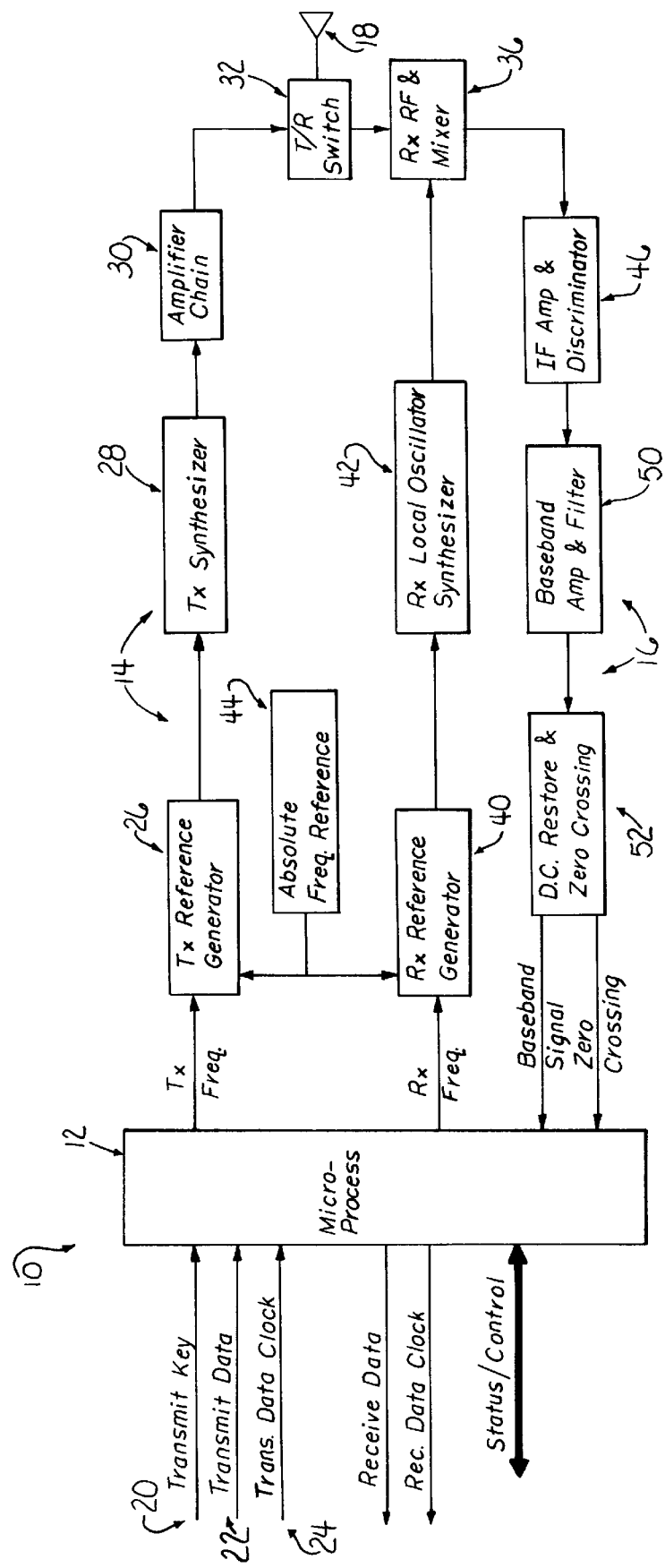
FIG. 1 is a general block diagram of a digital radio including the improved modulation and detection processes according to the present invention.

FIG. 1 is a brief overview of a digital data radio apparatus which utilizes the present invention. While FIG. 1 illustrates a transceiver, it is to be understood that aspects of the present invention can be employed in transmitters alone and in receivers alone. Thus, FIG. 1 illustrates a narrow band multi state frequency shift key (FSK) half duplex radio frequency (RF) assembly 10 designed to transmit and receive digital data at clock rates up to 19.2 kilo bits per second (KBPS). Assembly 10 includes a microprocessor 12, a transmitting section 14, a receiving section 16 and a common antenna 18. When the externally driven transmit key line 20 goes high, the microprocessor 12, for example a Motorola 68 HC11 controller, accepts data from lines 22,24 which is internally converted into frequency commands that are output to a transmitter reference generator 26 which, in turn, creates a frequency modulated reference signal at frequencies 1/N of the desired transmit frequency. In accordance with the present invention the reference signal transitions smoothly from one state to another in a manner which will be described in detail presently. This reference signal is applied to a frequency synthesizer 28, where it is multiplied by N, input to an amplifier chain 30 and connected to an RF output connector (not shown) for antenna 18 via a transmit/receive switch 32. N is the multiplier of a phase lock loop circuit in synthesizer 28 which will be described presently.

When the transmit key line 20 is low, the T/R switch 32 connects the RF connector to a receiver RF and mixer section 36, where the received signal is filtered, amplified, and applied to a mixer. The local oscillator is generated in the same fashion as the transmitter signal described above, wherein a receiver reference generator 40 provides an input to a synthesizer 42 outputting a local oscillator signal 45 MHz offset from the desired receive frequency. A controlled oscillator 44 is connected to both reference generators 26 and 40 to control the accuracy thereof. Thus the mixer output is the desired signal mixed down to an intermediate frequency of 45 Mhz. The IF signal is applied to an IF amplifier and discriminator 46, creating a baseband signal which is applied to a filter and amplifier 50. A function similar in effect to an automatic frequency control is performed by a D.C. restore circuit 52, which will be described, and which follows the baseband amplifier 50 to address the potential for error rate increases due to frequency shift. The resulting signal is applied to an analog to digital converter input of microprocessor 12, and to a comparator in microprocessor 12, the output of which enables the microprocessor to establish and maintain symbol clock timing, or to determine when to sample (analog to digital conversion) the received signal, all in a manner which will be described. The sampled signal is used to make "state" decisions, or to decide the bit(s) to output for each symbol. The resulting bit stream is output from microprocessor 12 to the external hardware which typically includes a central processor (not shown).

The half duplex RF assembly 10 illustrated in FIG. 1 is particularly useful in a metropolitan area communications network system. Among the requirements it satisfies are increased data rate for fixed occupied RF bandwidth, increased RF selectivity and increased IF selectivity. The system 10 employs a FSK modulation scheme, and increased data rates with fixed RF bandwidth dictate a four state FSK(two bits per symbol) approach. The system 10 of FIG. 1 allows a standard two state (one bit per symbol) or a four state (two bits per symbol) operation, with the selection being under control of the afore-mentioned central processor. Since two state operation is a simplification of the four state mode, only four state operation is discussed here. It should be understood, however, than the present invention is readily adaptable to multi-state systems. FIG. 2 illustrates the relationship between a typical bit stream 60, the corresponding symbol stream 62, and the frequency modulated transmitted waveform 64. In the absence of restraints on the spectrum of the transmitted signal, the transitions between symbols (frequency) would be abrupt, causing spectral "splatter". This is avoided in the radio 10 of the present invention by generating a reference signal that transitions smoothly from one state to another in a fashion approximating a raised cosine in a manner which will be described in detail presently. The exact points in time the signal value is inspected during reception or detection to make a symbol decision is very important, and the "distance" between states ($\delta$) is ⅓ (or nearly 10 dB less than) the separation for a two state system. In particular, the signal should be sampled or inspected at the transitions, i.e. at the peaks and troughs of the signal having the form of waveform 64. The times at these transitions, i.e. 1T, 2T, 3T, 4T etc. as shown in FIG. 2 are the symbol times. For the 19.2 KBPS four state system of FIG. 1, the peak deviation from the nominal transmit frequency is 3.2 kHz (2.13 kHz between states). Since the symbol rate is 9.6 kHz, or the rate of cycling through a set of outside symbols is 4.8 kHz, a beta of 3.2/4.8 results wherein beta is the ratio of the carrier deviation to the modulation frequency.

Figure 3A:
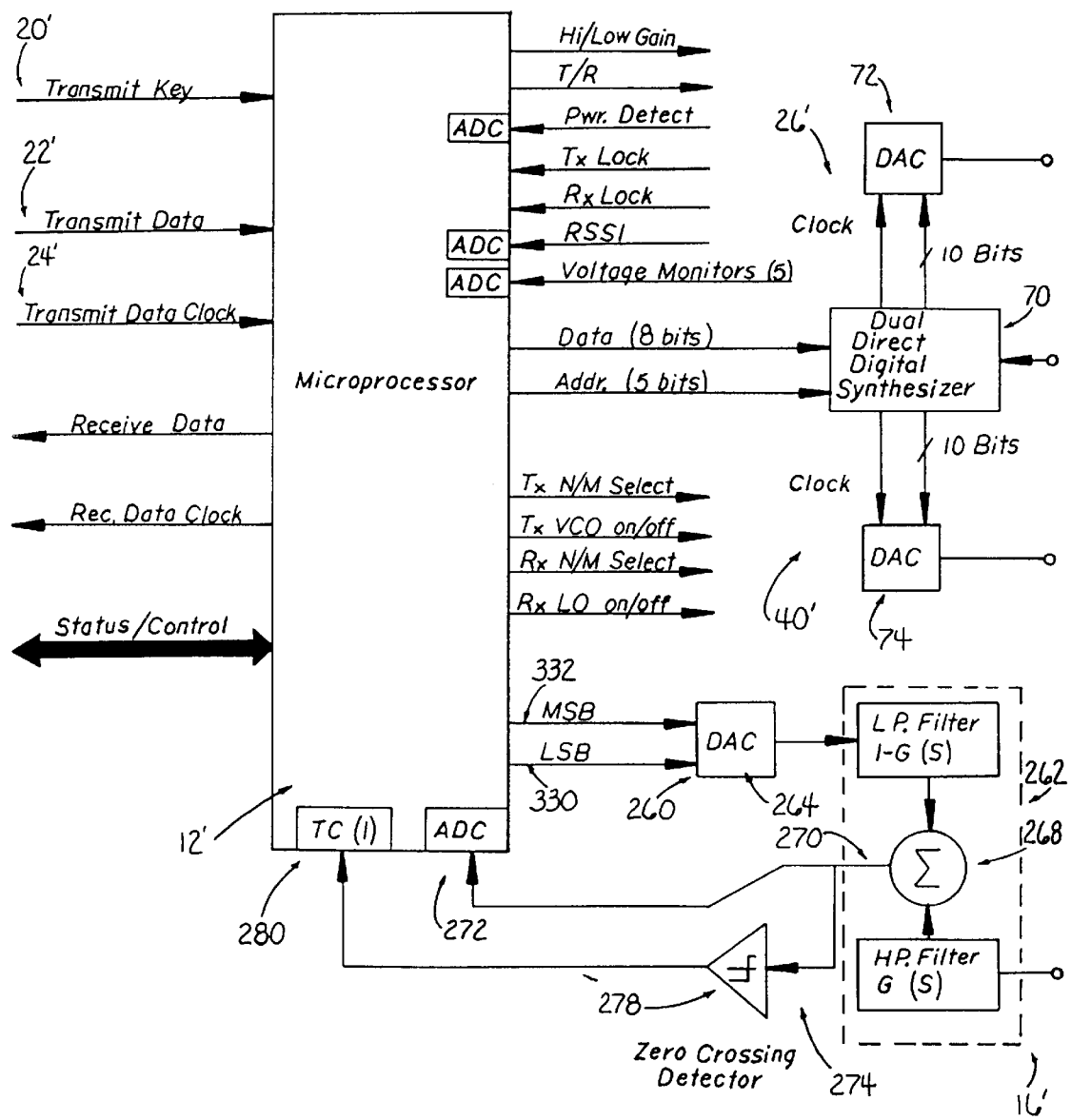
FIG. 3A, FIG. 3B and FIG. 3C depict three consecutive parts of a detailed block diagram of the digital radio of FIG. 1.
Figure 3B:
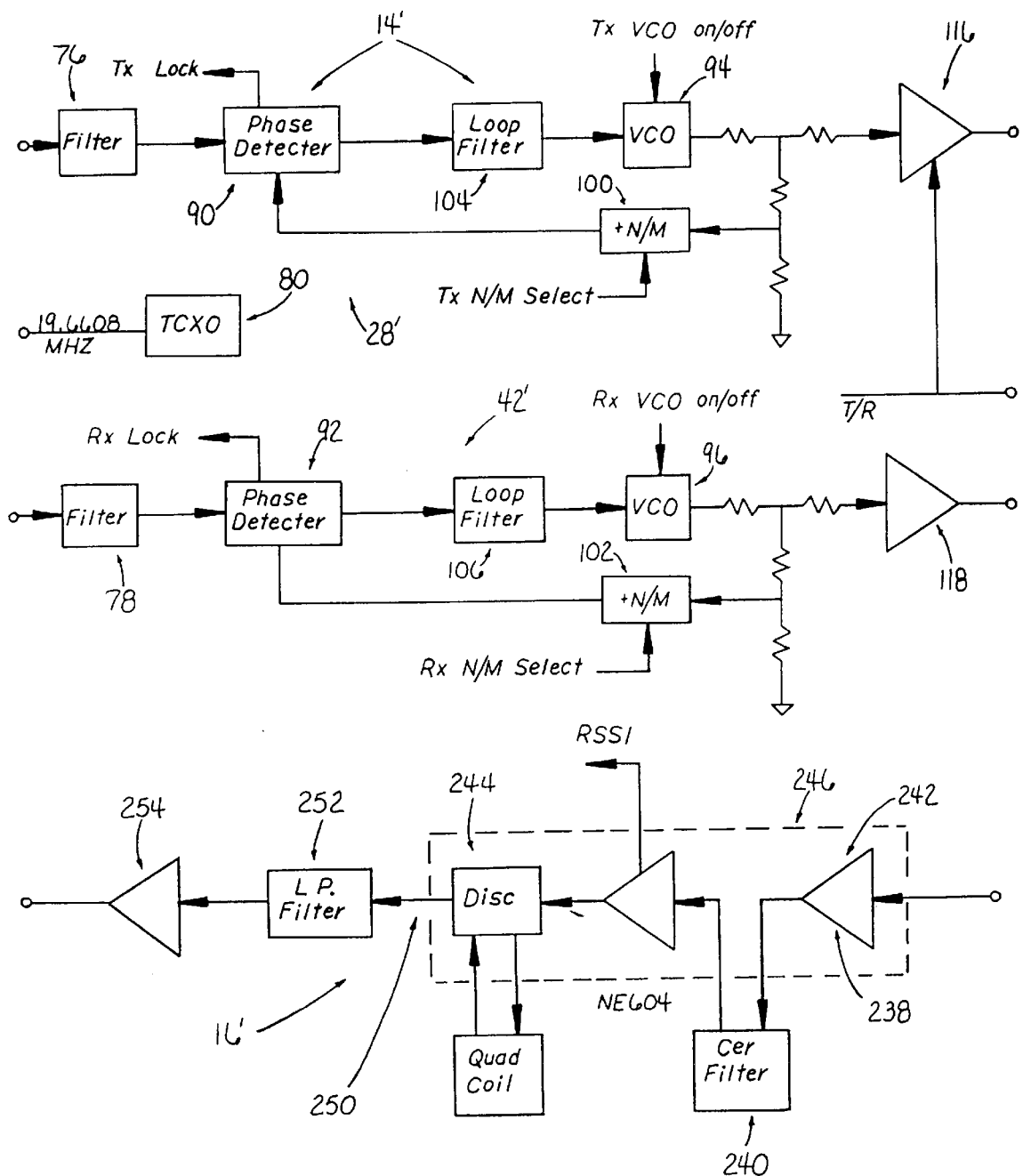
Figure 3C:
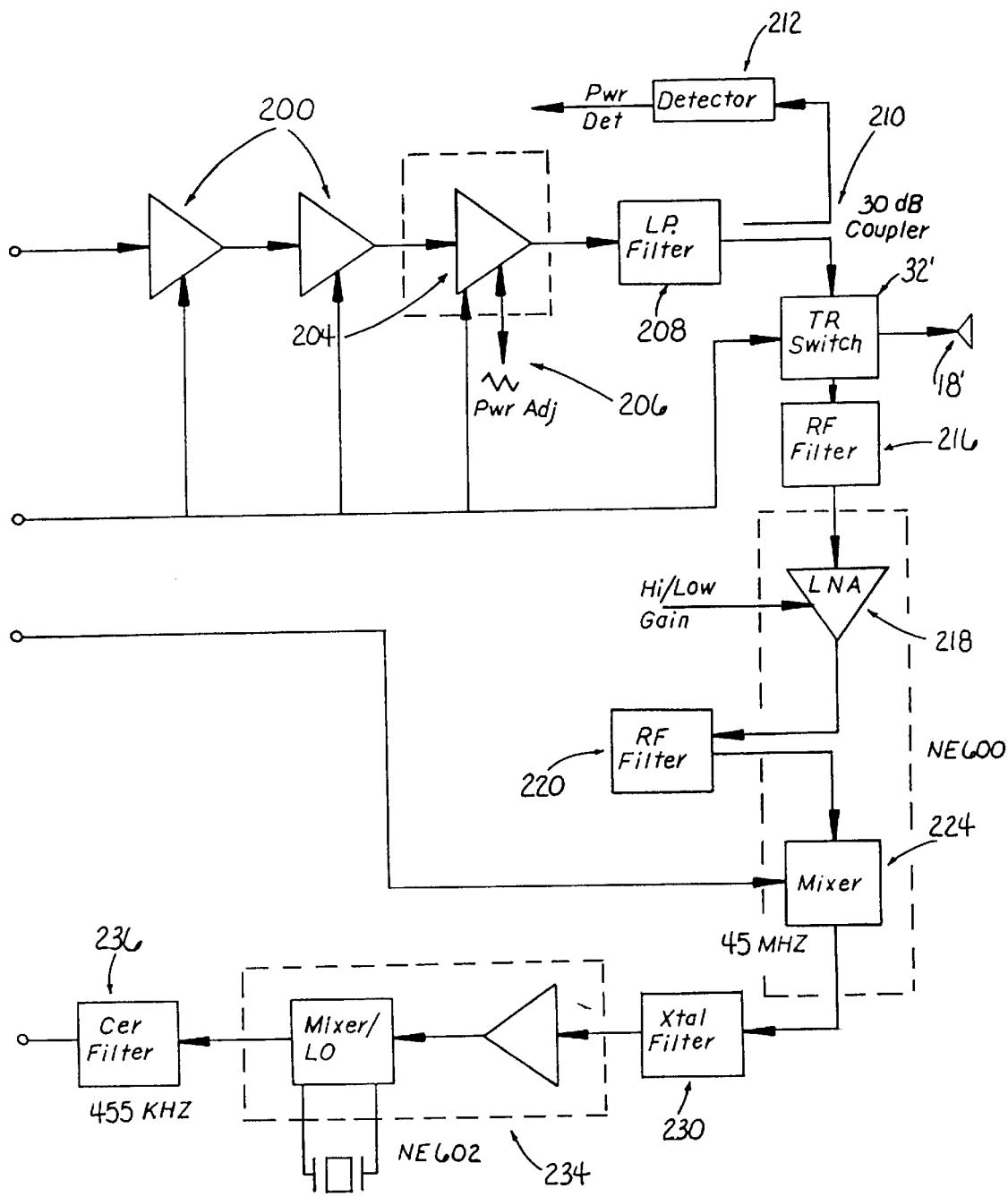

FIG. 3A, FIG. 3B and FIG. 3C depict three consecutive parts of a is a detailed block diagram of the transceiver 10 illustrated in FIG. 1. In the system of FIG. 3B components which are the same as those in the assembly of FIG. 1 are identified by the same reference numeral with a prime designation. The radio system 10' accepts an externally clocked bit stream on lines 22',24' from the external hardware (not shown) upon a positive going transition of the Transmit Key line 20' of microprocessor 12'. The first sixty four bits must be alternating pairs of zeros and ones (1,1,0, 0,1,1,0,0,1 . . . , or 0,0, 1,1,0,0,1, . . . ). The microprocessor 12' checks for this bit pattern, and aligns the symbols to cause a 0,3,0,3,0,3,0,3 . . . symbol pattern or preamble to be transmitted. This pattern guarantees that symbol clock phasing at the receiver will be locked with sufficient accuracy to insure specified bit error rates following these first 32 symbols (3.265 milliseconds) Because both transmitter and receiver local oscillator synthesizers 28' and 42', respectively run continuously, this symbol clock time is the only "lost time" in transitioning from receive to transmit imposed by the radio 10'. The microprocessor 12' thus combines adjacent bit pairs to define a symbol value of 0, 1, 2, or 3. This new symbol corresponds to one of four frequencies which, coupled with the last frequency command, defines a frequency transition from the last state to the next state. In accordance with the present invention, a series of commands equivalent to small steps approximating a sinusoidal transition to the next desired state are issued to the reference generators 26' and 40' in a manner which will be described. The reference generators 26' and 40' are provided by a dual direct digital synthesizer (DDS) 70, a pair of digital to analog converters (DAC) 72 and 74, one for transmitting section 14' and the other for receiving section 16', and a pair of band pass filters 76 and 78, one for transmitting section 14' and the other for receiving section 16'. Absolute frequency accuracy is controlled by a 19.6608 MHz temperature compensated crystal controlled oscillator (TCXO) 80 connected to DDS 70 and which is accurate to one part per million over the specified temperature range, and one part per million per year long term drift. The DDS 70 actually accepts phase change commands from the microprocessor 12', and a phase accumulator in DDS 70 is incremented by the commanded phase step at the rate of the frequency of TCXO 80. Thus the phase accumulator in DDS 70 contains the argument for the desired sinusoid at the instant of update of the phase increment. Via a table lookup method, a digital word is output corresponding to the amplitude of the desired sinusoid. This digital word is applied to the ten bit digital to analog converter 72, providing a sampled version of the desired reference signal, which is filtered at 76 to form the reference signal input to the phase lock loop multiplying synthesizer 28' of transmitting section 14'. Similarly, a ten bit digital word is applied to DAC 74, the output of which is processed by filter 78 and applied to the input of synthesizer 42' of receiving section 16'. It is emphasized that the absolute frequency of the reference is not related to the TCXO 80, but rather the phase step output by microprocessor 12'. The accuracy of the reference frequency is, by contrast, determined by the TCXO 80, since it exclusively determines the period between phase accumulator updates. Phase noise is partially determined by the TCXO 80, the DACS 72,74, the DDS 70, and characteristics of the synthesizers 28' and 42'. The nominal frequency of the reference signal at the output of each filter 76,78 is 7 MHz.

Thus DDS 70 consists of two independent DDS functions each controlled by a common interface to microprocessor 12' which interface controls the phase and frequency of the DDS. DDS 70 operates, briefly, on the principle that a digitized waveform of a given frequency can be generated by accumulating phase changes at a higher frequency. Sampling theory requires that the generated frequency be no more than one-half of the clock frequency (Nyquist rate). The phase value stored in either phase increment register of DDS 70 is added to the value in the phase accumulator once during each period of the system clock. The resulting phase value (from 0 to 2) is then converted to a corresponding sine amplitude whereupon the resulting digital word is output from DDS 70.

In particular, to output a particular frequency, the associated phase increment value must be loaded into the phase increment register. The generated frequency ($F_G$) and clock frequency ($F_s$) are related to the phase increment value ($\Delta\emptyset$) by the following equation:

$$FG = \frac{F_s \cdot \Delta\emptyset}{2^N}$$

where N equals the number of bits in the phase accumulator. Using this formula, frequency resolution can be generated in exact Hz steps. For example, given a system clock frequency (Fs) of 19.6608 and a desired generated frequency (FG) of 6.5 MHz with a 32 bit phase accumulator (N=32) and using the formula given above:

$$6.5 \text{ MHz} = \frac{19.6608 \text{ MHz} \cdot \Delta\emptyset}{2^{32}}$$

$$\Delta\emptyset = 54A2AAAA (hex)$$

Using 19.6608 MHz as the clock frequency, a frequency (in Hz) can be generated. For example, with Fs=19.6608 MHz and N=32 the frequency resolution is approximately 0.0045776367. Therefore from the above formula if $\Delta\emptyset$ is 874 (36AHex), FG=1 Hz; if $\Delta\emptyset$ is $2^8$ (100 Hex), FG=2 Hz; and if $\Delta\emptyset$ is $2^9$ (200 Hex), FG=4 Hz.

Any frequency can be generated by programming the phase change within the bit resolution of the phase accumulator. The phase accumulator registers of DDS 70 in the present illustration are 32 bits wide. The frequency resolution can be determined by the following formula:

$$\text{Frequency Resolution} = Fs/2^N$$

where Fs is the frequency of the system clock and N is the number of bits in the phase accumulator. For example, where Fs is 20 MHz and N is 32, the frequency resolution is approximately 0.004577637.

For a more detailed description of the foregoing subject matter, reference may be made to U.S. Pat. No. 4,965,533 issued Oct. 23, 1990 and entitled "Direct Digital Synthesizer Driven Phase Lock Loop Frequency Synthesizer" and to U.S. Pat. No. 5,028,887 issued Jul. 2, 1991 and entitled "Direct Digital Synthesizer Driven Phase Lock Loop Frequency Synthesizer With Hard Limiter", the disclosure of both of which patents are hereby incorporated by reference. By way of example, in an illustrative radio, DDS 70 is a Qualcomm Q 2334 dual direct digital synthesizer.

The reference signal at the output of each filter 76 and 78 is applied to a corresponding phase detector 90 and 92, respectively, which compares this input signal phase with the phase of a corresponding voltage controlled oscillator (VCO) output 94 and 96, respectively, divided by $N_{PLL}$ which in the present illustration is 128 or 129, in a corresponding loop divider 100 and 102, respectively as will be described. The output signal from each detector 90 and 92 is a pulse width modulated pulse train at the reference frequency with average value proportional to the phase difference of the two input signals. This error signal is applied to the corresponding VCO 94 and 96 after filtering by a corresponding loop filter 104 and 106, respectively. Thus, phase detector 90, loop filter 104, VCO 94 and loop divider 100 comprise a phase locked loop (PLL) of the transmitting section 14'. Similarly, phase detector 92, loop filter 106, VCO 96 and loop divider 102 comprise a phase locked loop (PLL) of the receiving section 16'. In accordance with the present invention, each loop filter 104,106 of the corresponding phase locked loop causes the closed loop frequency response of the phase locked loop to be wide enough to pass the modulation on the reference signal, but narrow enough to filter out the high frequency content in the reference signal from the several steps that transition from one frequency "State" to the next. In effect, the corresponding phase detector 90,92 effectively samples the phase error at the reference frequency. Since the reference signal is a filtered version of a sampled signal (via the DAC 72 or 74 clocked at the TCXO 80 frequency), it has significant harmonic content at multiples of the sampling frequency. To avoid severe noise problems from the two uncorrelated sampling frequencies (ailiasing effects), the VCO 94,96 output frequency divisor can be switched between 128 and 129. Thus at operating frequencies where sampling noise falls within the passband of the phase lock loop (PLL) filter 104 or 106, the divisor is changed to move the noise well outside the PLL passband. Buffer amplifiers 116 and 118 are included in the corresponding synthesizers 28' and 42', respectively, to isolate the corresponding VCO from phenomenon that could add phase noise in the output.

Figure 4:
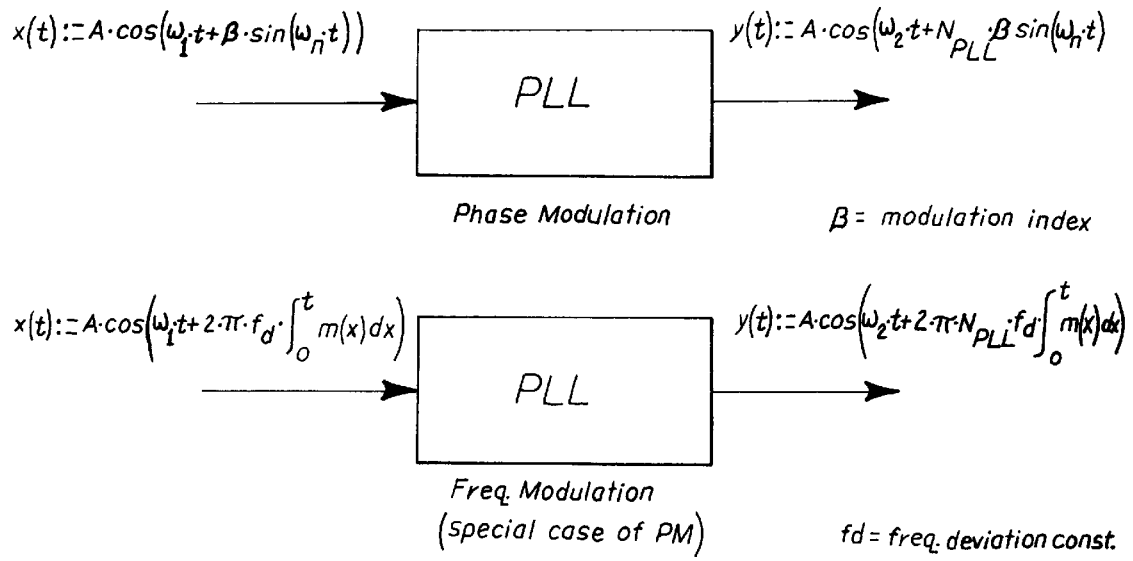
FIG. 4 is a block diagram illustrating operation of the phase lock loop in the radio of FIG. 3A, FIG. 3B and FIG. 3C.

The foregoing is illustrated in further detail as follows. The phase lock loop acts as a multiplier of the output of DDS 70. As shown in FIG. 4, in general a signal with a modulation index β and center frequency fc when passed through the phase lock loop (PLL) will be multiplied by the phase lock loop divider value $N_{PLL}$. Therefore, by frequency modulating the DDS signal with the appropriate signal fm, frequency or phase modulated signal outputs can be generated by the phase lock loop.

The phase lock loop acts as a first order bandpass filter for the multiplied signal. The one sided bandwidth of the phase lock loop is the closed loop bandwidth. The loop should be made just wide enough to pass the modulated signal. This will enable the phase lock loop to remove spurious signals and mixing product frequencies between the harmonics of the system clock and the DDS frequency. This is illustrated further in FIG. 5 which is a frequency spectrum of the input to the filter 76 or 78 where fc is the center frequency and $f_{clk}$ is the frequency of TCXO 80. The low sampling image 122 is the result of operating DDS 70 at or near the Nyquist rate, and the other sampling products 123 also are shown. The output of DDS 70 will contain amplitude modulated noise spurs due to quantization errors in D/A converters 72 and 74. These spurs can be minimized by using the combination of a bandpass filter and hard limiter as shown in the aforementioned patent 5,028,887. The phase lock loop also filters the signal by attenuating all frequency components outside of its loop bandwidth. The r.f. filter 76 or 78 should pay special attention to removing the low side band products of the system clock. The transfer function of the band pass filter 76 or 78 is designated 124 in FIG. 5. In addition, care should be taken to avoid using phase lock loop divider ratios which cause (n * $F_{cLK}$)–(m * $f_{DDS}$), where n and m are integers, to fall within the bandwidth of the phase lock loop. If a difference does occur within the band, an unwanted spur will result. In the radio of the present invention, the foregoing is accomplished by selecting $N_{PLL}$ to be 128 or 129 as previously described.

In high performance communication systems, phase noise and spurious performance of the frequency synthesizers are critical. The following signals on the DDS reference will be changed when multiplied by the phase lock loop: AM spurious tones, PM spurious tones, FM spurious tones, discrete spurious tones and phase noise. For example, with AM spurious tones the AM products move by an integral number of times in frequency and the modulation index remains unchanged, i.e. the spurs are not large at the output of the PLL multiplier. With PM spurious tones and the carrier modulated by a sinusoid, PM spurs centered about the carrier increase in amplitude only and the frequency is unchanged. With FM spurious tones, the FM spurs centered about the carrier increase in voltage by a factor of $N_{PLL}$ and the frequency deviation which also is a function of fm charges by a factor of $N_{PLL}$.

Figure 5:
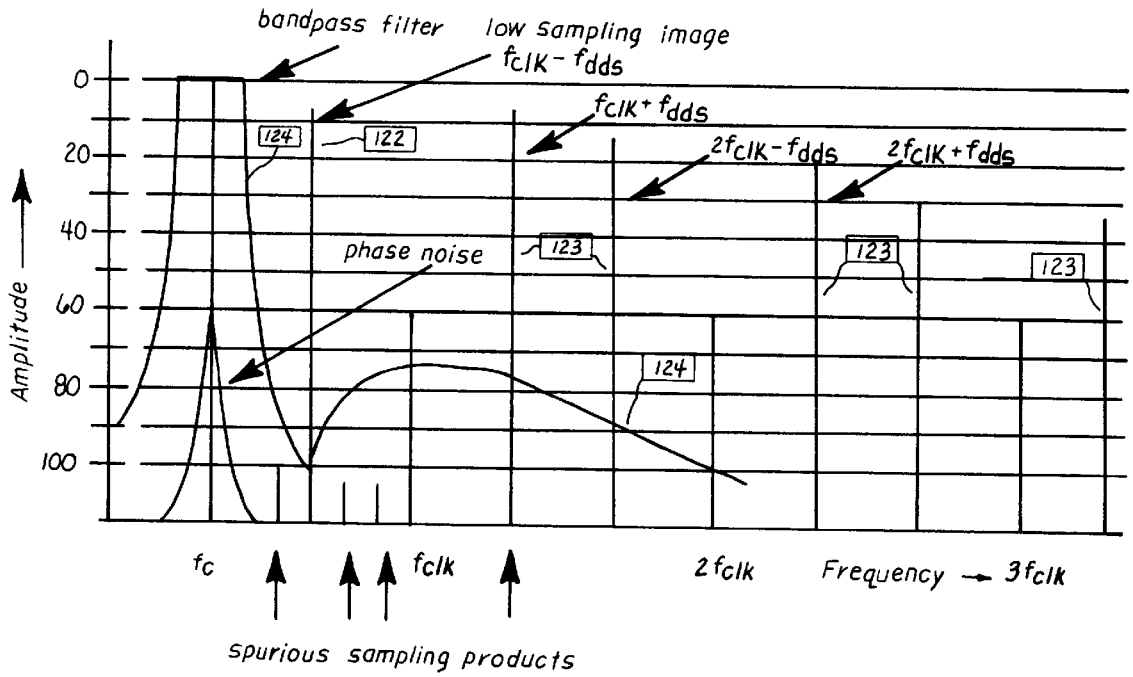
FIG. 5 is a graph of frequency spectrum of a signal at a particular location in the radio of FIG. 3A, 3B and FIG. 3C.

Given that a high performance communication system handles desired or undesired signals in the foregoing ways, the following design parameters must be met. The division ratio of the phase lock loop, $N_{PPL}$, must be kept low in value. This minimizes the effects of the phase noise from the DDS 70 and is accomplished by operating DDS 70 near the Nyquist rate. The phase lock loop bandwidth must be kept wide enough to pass just the modulated signal and no wider. It is important that the phase lock loop remove the sampling product from the DDS frequency steps used to create the modulation, which steps will be described in detail presently. In addition, a narrow bandpass filter, i.e. filters 76 and 78 in FIG. 3B, should be employed between DDS 70 and the corresponding phase lock loop. The filter must have sharp high side cut-off to remove possible a aliasing components especially from products of the system clock. The lower sampling image will be less than one octave away, as shown in FIG. 5, and almost of equal amplitude to the desired signal.

For a more detailed description of the PLL-DDS combination, reference may be made to the aforementioned U.S. Pat. Nos. 4,965,533 and 5,028,887.

As previously described, in the absence of restraints on the spectrum of the transmittal signal, the transitions between symbols (frequency) would be abrupt, causing spectral "splatter". This is avoided in the radio 10' of the present invention by generating a reference signal that transitions smoothly from one state to another in a fashion approximating a raised cosine. The DDS 70 generates a reference to which the PLL is locked. In accordance with the present invention, the DDS phase increment value is changed thereby changing the frequency of the VCO of the PLL so that a precisely digitally controlled angle modulation of the RF carrier can be generated. The resulting precise control allows easy multi-state modulation and precise control of the signal spectrum. Thus, the precise frequency resolution in the DDS reference allows precise angle modulation of the RF carrier.

Figure 6:
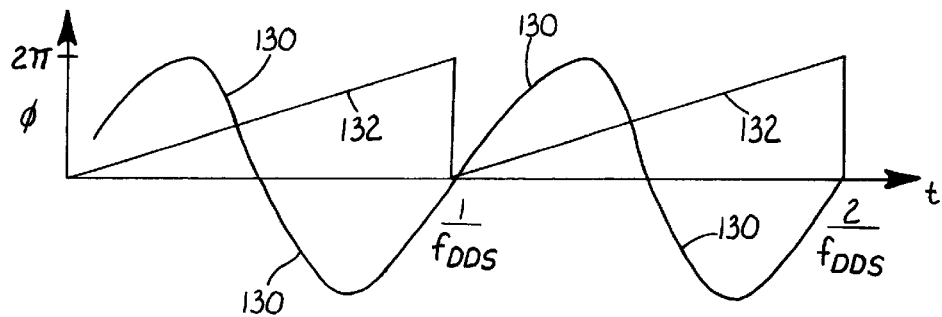
FIG. 6 is a graph including waveforms illustrating operation of a direct digital synthesizer of the type included in the radio of FIG. 3A, FIG. 3B and FIG. 3C.
Figure 7:
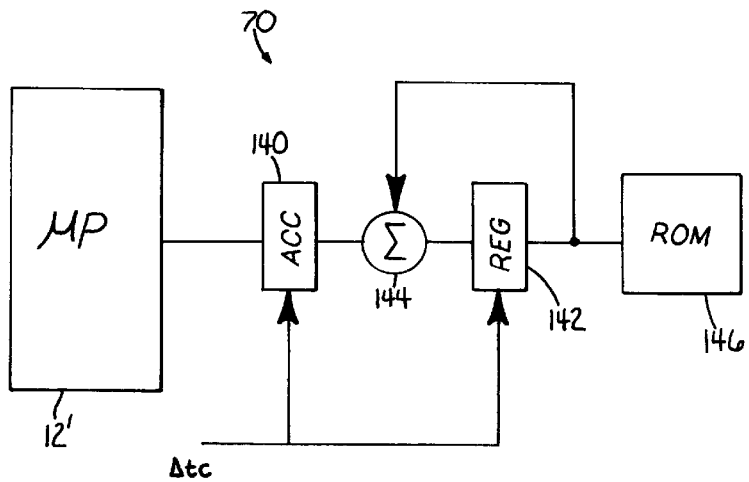
FIG. 7 is a schematic functional diagram of a portion of the direct digital synthesizer in the radio of FIG. 3A, FIG. 3B and FIG. 3C.

In particular, the phase accumulator in DDS 70 accumulates phase linearly with time. This is illustrated in FIG. 6 wherein waveform 130 is the sinusoidal reference signal at the output of either filter 76 or 78 associated with the DDS 70. Waveform 132 represents the linear accumulation of phase in DDS 70 wherein the phase increment into the DDS is constant. If, on the other hand, the phase increment into DDS 70 is changed in accordance with the present invention, the frequency output by the DDS will change. This is illustrated in FIG. 7 which is a schematic functional diagram of a portion of DDS 70 and in FIG. 8 which shows an illustrative form of a desired modulation signal. Referring first to FIG. 7, DDS 70 includes, briefly, a phase increment register 140, a phase accumulator comprising the combination of register 142 and summer 144 and a read-only memory 146. Conventionally, the phase value ΔØ stored in register 140 is added to the phase value in the accumulator 142 and 144 once during each period of the system clock $\Delta t_c$. The resulting phase value is applied to ROM 146 once during each clock cycle to convert the phase information to its corresponding sine amplitude as previously described. The foregoing operation is governed by the relationship:

$$f = \frac{d\emptyset}{dt_c} = \frac{\Delta\emptyset}{\Delta t_c}$$

where f is the frequency of the resulting sine wave.

Figure 8:
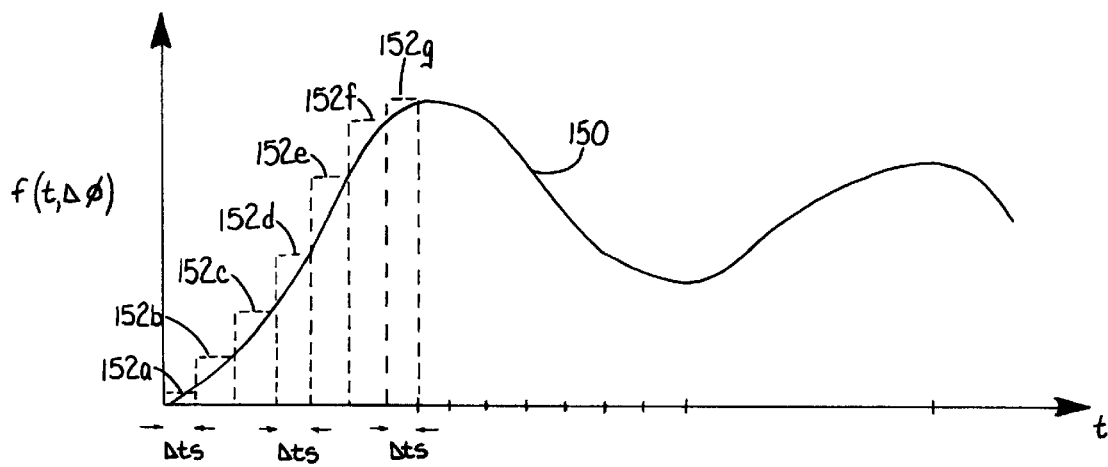
FIG. 8 is a graph including a waveform of the desired form of modulation signal provided by the radio of the present invention.

In accordance with the present invention, the symbol time of the desired modulation signal is divided into a plurality of intervals and for each interval the phase increment value $\Delta\emptyset$ is changed if necessary so as to have the value needed for producing the desired modulation signal. As shown in FIG. 8, the desired modulation signal 150 has symbol times designated 1T, 2T, 3T etc. corresponding to the symbol times described in connection with FIG. 2 Each symbol time is divided into a plurality of time intervals designated $\Delta t_s$, for example seven in the present illustration, and during each interval $\Delta t_s$ the phase increment $\Delta\emptyset$ will have a different value (if necessary) to generate the desired modulating function represented by waveform 150. Each of the steps designated 152a–152g corresponds to a change in the phase increment value $\Delta\emptyset$. Since phase and frequency are related according to the relationship:

$$\text{frequency} = \frac{d\emptyset}{dt} = \frac{\Delta\emptyset}{\Delta t}$$

changing the phase increment value $\Delta\emptyset$ as described hereinabove changes the frequency of the modulation function 150 as shown in FIG. 8 thereby enabling the generation of a precisely digitally controlled frequency modulated signal.

Thus, each interval $\Delta t_s$ will have its own value of $\Delta\emptyset$. In other words from one $\Delta t_s$ to another $\Delta\emptyset$ may change, and this is what allows generation of the desired modulating signal. In addition, while each symbol time 1T, 2T, 3T etc. is divided into the same number of intervals $\Delta t_s$, i.e. seven in the present illustration, from one symbol time to another the phase increment values during the corresponding intervals $\Delta t_s$ may be different depending upon the shape of the desired waveform. Also, during each interval $\Delta t_s$ there will be many cycles of the DDS phase accumulator 142,144 because the frequency of the system clock signal applied to register 142 is significantly greater than the frequency of the signal providing the $\Delta t_s$ intervals.

Figure 9:
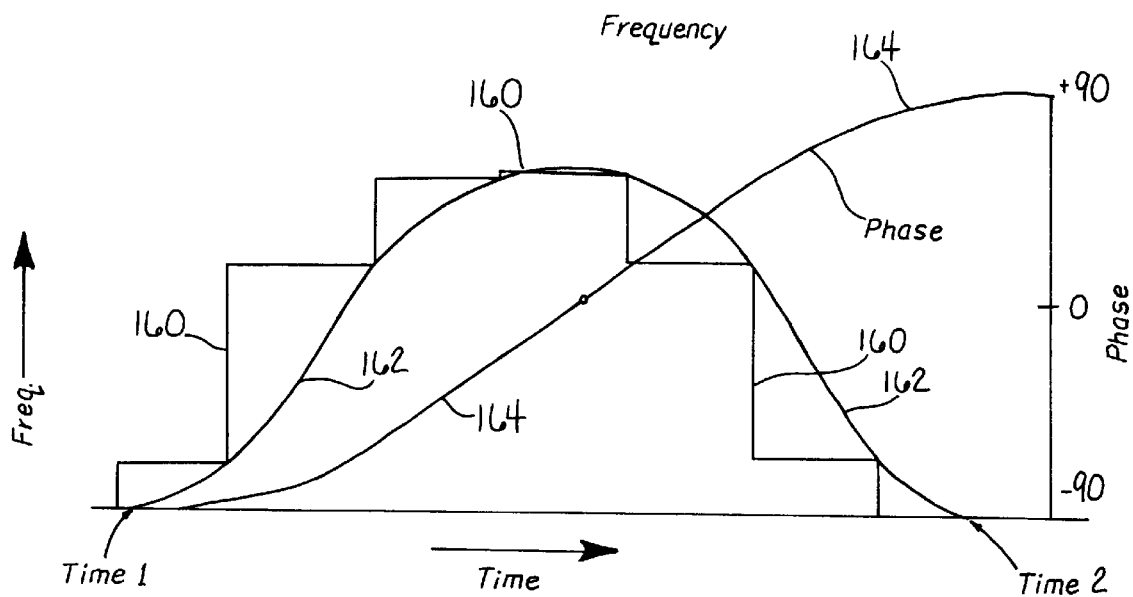
FIG. 9 is a graph including waveforms illustrating phase modulation according to the process of the present invention.

As previously described, DDS 70 increments the phase in the accumulator thereof by $\Delta\phi$ every clock cycle. If the phase increment $\Delta\phi$ remains constant the frequency of the output of DDS 70 will remain constant. If $\Delta\phi$ is changed as represented by the stepped waveform 160 shown in FIG. 9, the frequency at time 1 and at time 2 is the same, as shown by waveform 162, but a 180° phase shift will occur as shown by waveform 164. Accordingly, an arbitrary phase as a function of time may be generated by varying the frequency as illustrated in FIG. 9. The times 1 and 2 in FIG. 9 correspond to symbol times previously defined, and the steps comprising waveform 160 correspond to the intervals $\Delta t_s$ in the description of FIG. 8.

The foregoing is illustrated further by considering the example of a raised cosine phase transition wherein the phase is represented by $\phi$coswt. The frequency is given by the relationship:

$$f(t) = \frac{d(\text{phase})}{dt} = \frac{d\phi(t)}{dt}$$

Thus, where phase=$\phi$coswt and $\phi$=90°, $$f = d(\phi\text{cos}wt)dt = -w\phi \sin wt$$

Thus, any form of angle modulation can be accomplished by the method and apparatus of the present invention.

Figure 10:
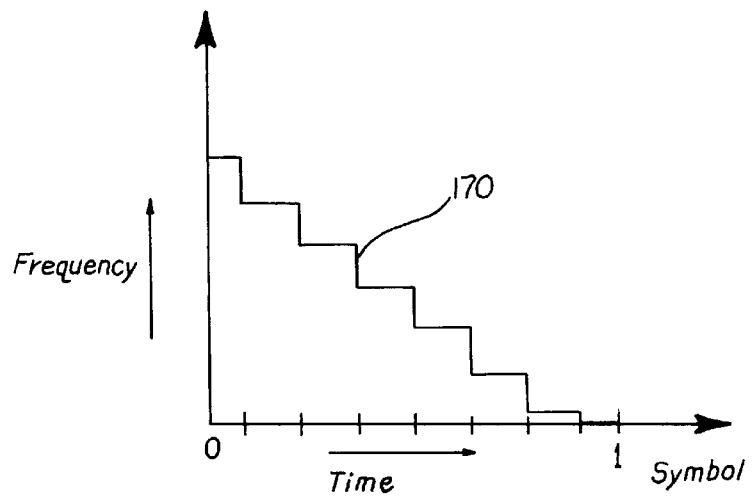
FIG. 10 is a graph including a waveform illustrating operation of the microprocessor in the radio of FIG. 3A, FIG. 3B and FIG. 3C.

The determination of the different phase increment value $\Delta\emptyset$ needed during the various intervals $\Delta t_s$ of each symbol time is performed by microprocessor 12' in the following manner. The $\Delta t_s$ intervals do not have to be equal thereby allowing microprocessor 12' some flexibility in handling the process. The control registers of DDS 70 are memory mapped to microprocessor 12'. During each symbol time, microprocessor 12' updates the DDS control registers a number of times equal to the number of $\Delta t_s$ intervals contained in each symbol time, in the present illustration seven. This shapes the frequency transition from one state to another state. In DDS 70 there are four 8 bit registers which make up the 32 bit phase increment. This phase increment is directly proportional to the DDS output frequency. The foregoing is illustrated further in FIG. 10 wherein the stepped waveform 170 represents the seven different frequencies in the DDS output during one symbol time as a result of microprocessor 12' updating the DDS control registers seven times during that symbol time. While microprocessor 12' is employed in the present illustration, the foregoing can be done by any special purpose digital logic.

Figure 11:
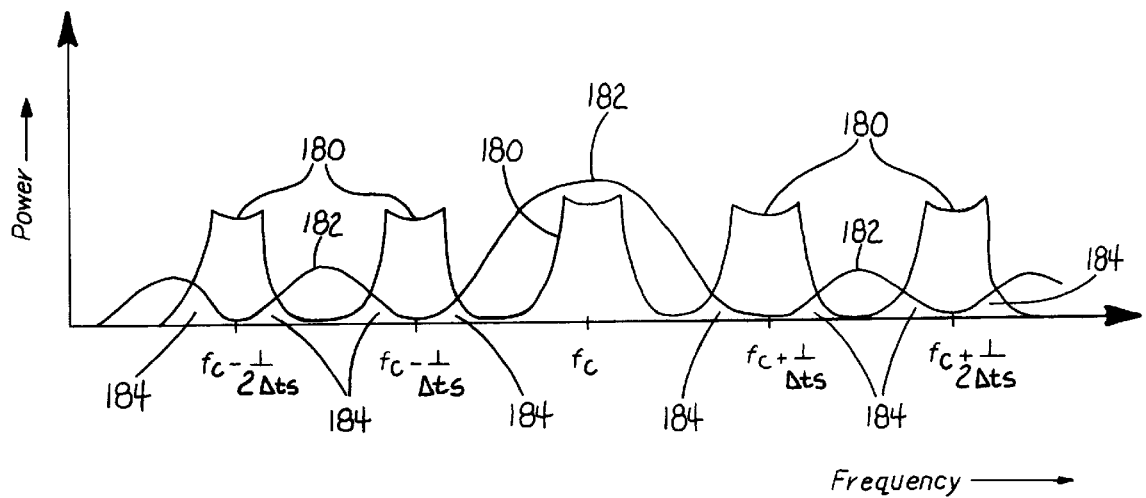
FIG. 11 is a power spectrum of a signal at a particular location in the radio of FIG. 3A, FIG. 3B and FIG. 3C.
Figure 12:
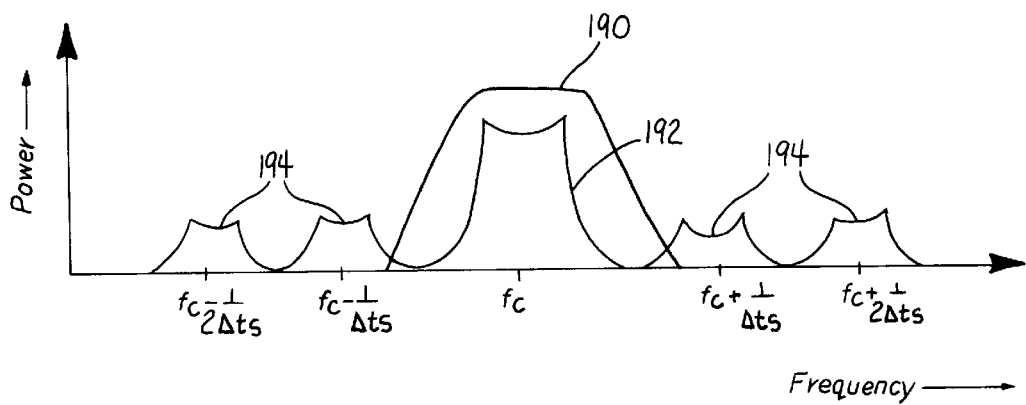
FIG. 12 is a power spectrum similar to that of FIG. 11 and illustrating operation of the phase loop in the radio of FIG. 3A, FIG. 3B and FIG. 3C.

The power spectrum of the output signal of either DAC 72 or 74 associated with DDS 70 will be the Bessel Function expansion of the desired modulation signal fm and the modulation index β. The zerohold approximation of the frequency modulation will produce sampling products as shown in FIG. 11. In particular, these sampling products add energy at multiples of the sampling frequency of fm which is $f_s=1/\Delta t_s$. The power spectrum is the Bessel Function expansion of the sampled fm signal power spectrum, represented by waveform 180 in FIG. 11, multiplied by the sinc function resulting from the zero order hold represented by waveform 182. These sampling products, designated 184 in FIG. 11, are undesirable signals and must be filtered out in the phase lock loop. In particular, the phase lock loop multiplies the DDS frequency by the divider value $N_{PLL}$. The phase lock loop bandwidth must be set high enough to pass the desired modulation signal but narrow enough to remove sampling products of the zerohold approximation and any other spurious signals, i.e. from DAC 72 or 74. This is illustrated in FIG. 12 wherein the transfer function of the phase lock loop filter, i.e. either loop filter 104 or 106, is shown at 190, waveform 192 is the frequency spectrum of the desired modulation signal and waveform 194 is the frequency spectrum of the sampling products removed or rejected by the phase lock loop filtering.

Referring again to FIG. 3B and FIG. 3C the output of buffer amplifier 116 which is the isolated output of synthesizer 28' as previously described passes through two low level preamplifier stages 200 providing the input to a 18 dB class C power amplifier 204. To meet FCC conducted emission requirements at the transmit frequency when radio 10' is in the receive mode (−57 dBm), all amplifier stages are turned off in receive mode. An external adjustment 206 for power level allows power outputs to range from 2 to 5 watts output power level at the output connector. A discrete low pass filter 208 allows the power amplifier 204 to reduce harmonic content below FCC requirements (−60 dBc measured). The final function in the transmitter is the −30 dB coupler 210 and detector 212 employed as an output power monitor. The coupler is located on the antenna connector side of the T/R switch 32' to detect failures as close to the antenna connector as possible. T/R switch 32' is a standard diode T/R switch which connects either the transmitter output or the receiver input to antenna connector on the radio board. Losses through the transmit switch path are typically 1.0 dB.

The receive signal is applied to an R.F. filter 216 to attenuate strong interfering signals. Two types of filters are employed; low insertion loss ceramic filters (2 dB) for the U.S. cellular band configuration, and helical filters (3 dB) in all other configurations. Specifications for the helicals are 3 dB over a minimum +/−7.5 mHz bandwidth. The filter output is applied to a low noise amplifier 218, for example the front end of an NE600 with a noise figure of 2 dB and a third order intercept of −14 dBm. Following a second stage of filtering with filters 220 identical to the input filters, the signal is mixed down by mixer 224 to a first I.F. frequency of 45 mHz. The two stages of R.F. filtering attenuate off frequency interference, and determine the image rejection of the receiver at the first I.F. The local oscillator for the first mixer 224 is identical in design to the transmitter reference generator 26' and synthesizer 28' with one exception. The LO synthesizer bandwidth is much narrower than that for the transmitter, allowing superior phase noise performance with associated improved receiver interference rejection characteristics.

A 45 MHz crystal filter 230 follows the first mixer 224. The bandwidth is +/−15 KHz representing a compromise between adjacent channel rejection and intersymbol interference due to variation in delay across the occupied bandwidth. The crystal filter 230 also determines the image rejection of the next, or second, mixer. The output of the crystal filter is amplified and down converted to 455 kHz second I.F. amplifier/mixer combination 234. The second mixer output goes through a ceramic filter 236, amplifier 238, a second identical ceramic filter 240, and limiting amplifier stages 242 before being detected by a standard mixer/discriminator 244 to develop a baseband signal whose level is proportional to received frequency deviation, and therefore representative of the transmitted symbol.

The baseband signal on line 250 is modified in two ways prior to state detection. First, the IF bandwidth required to pass the modulated signal is greater than required to pass the baseband signal, so some baseband filtering is accomplished by means of the combination of low pass filter 252 and amplifier 254. Secondly, any frequency drift in either the transmitted signal or shifts in local oscillator frequencies will result in a direct shift in the nominal (D.C.) level of the baseband signal. To avoid the complications of a fast AFC circuit, the method and apparatus of the present invention initially discards the very low frequency content of the baseband signal and then subsequently restores the low frequency information. In other words, since the data transmitted can be in any state for an arbitrarily long time, the very low frequency information must be restored. This is accomplished in two steps and employs the combination of a d.c. restore circuit 260 and complementary filter 262. First, the preamble pattern previously described in conjunction with a clamping circuit which will be described always "center" the baseband signal, or provides an initial condition. Second, since the detected symbols provide the exact low frequency data required in the absence of significant signal distortion, these symbols (or actually the decoded bits) are applied to a two bit D to A converter 264, filtered appropriately by the complementary filter 262, and added to the baseband signal as indicated at 268, all of which will be described in detail presently. The resultant conditioned baseband signal on line 270 is connected to an analog to digital converter (ADC) input 272 of microprocessor 12', and to a comparator generally designated 274 which creates a time reference edge when the baseband signal passes through a zero or reference deviation condition, i.e. a zero or reference crossing. In particular the conditioned baseband signal on line 270 is applied to the input of a zero crossing detector 278, the output of which is applied to a timer capture input 280 of microprocessor 12' which latches the microprocessor internal counter contents to establish the symbol time so that the A/D converter of microprocessor 12' samples the baseband signal at the proper times, i.e. at the peaks or troughs as seen on the waveform 64 in FIG. 2, as will be described in detail presently. Briefly, the operations in microprocessor 12' involve filtering and clock recovery by means of a type 1 servo control loop wherein microprocessor 12' utilizes information on past states to properly sample the present state.

Figure 13:
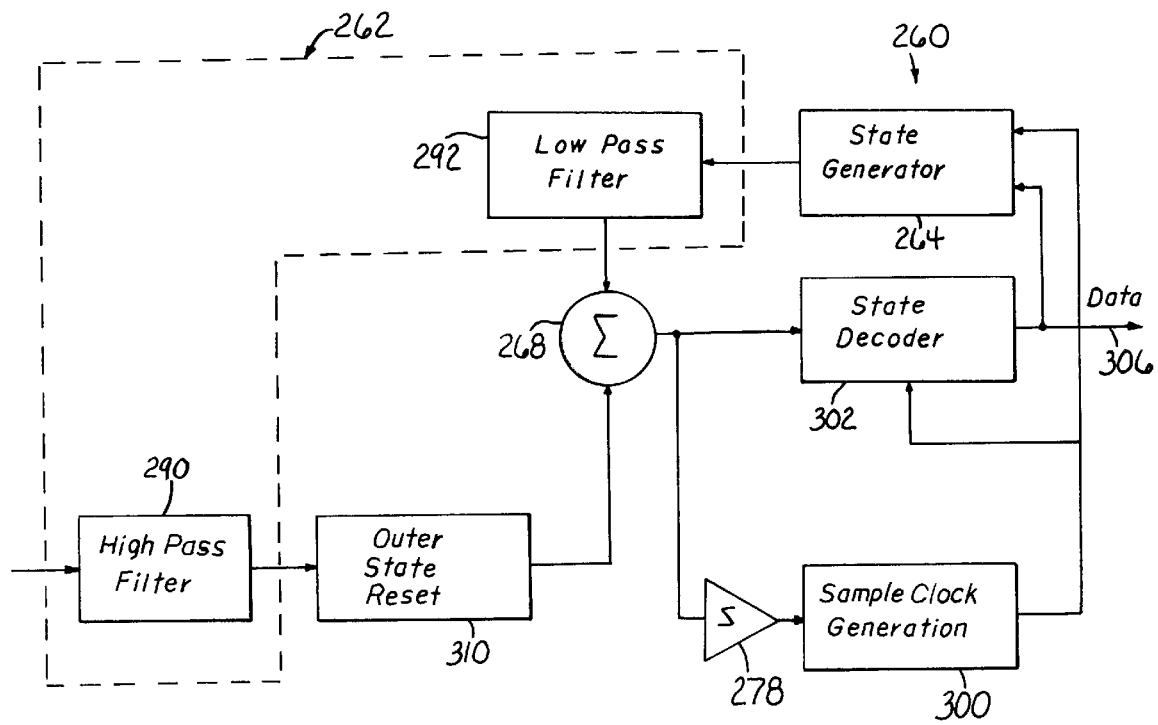
FIG. 13 is a block diagram of the d.c. restore circuit and complementary filter in the radio of FIG. 3A, FIG. 3B and FIG. 3C.
Figure 14:
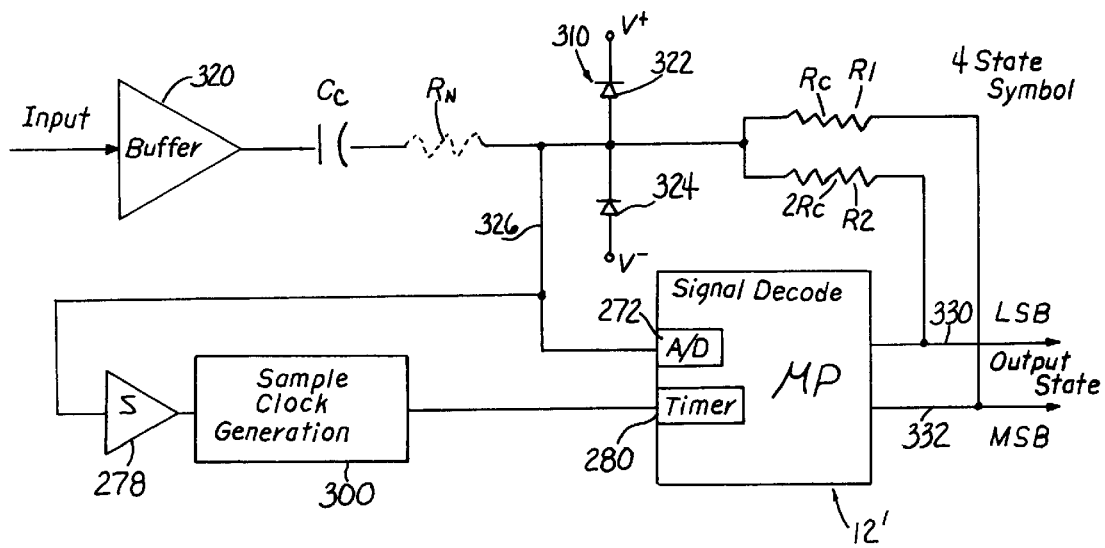
FIG. 14 is a schematic circuit diagram of the complementary filter and D/A converter in the radio of FIG. 3A, FIG. 3B and FIG 3C.

FIGS. 13 and 14 illustrate in further detail the combination of d.c. restore circuit 260 and complementary filter 262 as shown in FIG. 3A. The d.c. restore function according to the present invention is a simple method of providing automatic frequency control which corrects for differences or drift between the frequency of the receiver and the frequency of the transmitted signal being received. Because the low frequency portion of the received signal contains a relatively smaller amount of information, the d.c. restore process removes the lower frequency content of the signal. This is performed by the high pass filter 290 shown in FIGS. 3A and 13, the input of which is received from the receiver discriminator. After decoding, the resulting signal uses the decoded information to reconstruct the low frequency portion of the signal. This is performed by the D/A converter 264 and low pass filter 292 shown in FIGS. 3A and 13. This portion is summed back into the signal as shown at 268 in FIGS. 3A and 13.

The sample clock generation 300 shown in FIG. 13 includes the timer capture input 280 and internal counter of microprocessor 12' and establishes and maintains symbol clock timing to determine when to sample the received signal. The sample clock signal is applied to state decoder 302, which is the A/D converter in microprocessor 12', and to the state generator or D/A converter 264. The output data on line 306, i.e. the decoded bits from the baseband signal, is the data output of microprocessor 12' which is utilized by the external hardware previously described. The outer state reset 310 is the clamping circuit which centers the baseband signal and which will be described in detail presently.

A preferred circuit for implementing the complementary filter 262 and D/A converter 264 shown in FIG. 14. The input to buffer 320 is a signal with a d.c. bias from the receiver discriminator. The signal is high pass filtered by the combination of capacitor $C_c$ and the combination of resistor $R_c$ and resistor $2R_c$. The clamping circuit 310 comprising diodes 322 and 324 connected between positive and negative d.c. sources $V^+$ and $V^-$ resets the data on the outer states. Clamping circuit 310 removes enough bias from the signal so that the sample clock signal can be extracted from the data. In particular, the clamped signal on line 326 is applied to the A/D converter input 272 of microprocessor 12' and to the input of zero crossing detector 278, the output of which is applied to the timer capture input of microprocessor 12' as previously described to provide a sample clock for the A/D converter of microprocessor 12'.

Once the proper clock phase is known, the decoded data states on lines 330 and 332 for microprocessor 12' are fed back through a low pass filter comprising the combination of resistors $R_c$, $2R_c$ and capacitor $C_c$ which sees effectively zero impedance at the output of buffer 320. The combination of resistors $R_c$ and $2R_c$ acts as a digital to analog converter with the most significant bit being applied to $R_c$, the least significant bit being applied to $2R_c$ and the input/output relationship being defined by:

$$V_{out} = \frac{R1}{R1+R2} V_{in}$$

where the resistor $R_1$ is assumed to be connected at one end to the circuit ground or reference. Advantageously, the two filters, i.e. high pass and low pass, comprise the same resistors and capacitor and therefore exactly match one another with respect to removing the low frequency content of the signal and then replacing it with the proper d.c. level. In the circuit of FIG. 14 resistor $R_N$ functions as a noise filter to average out noise peaks and minimize their ability to reset the circuit through the clamping diodes.

The foregoing is illustrated in further detail by the following example. In the high pass filter mode, the input is to capacitor $C_c$ and the output is from the parallel combination of resistors $R_c$ and $2R_c$ in the circuit of FIG. 14. Letting $C=C_c$ and $$RP = \frac{2R_c R_c}{2R_c}$$

the transfer function for the high pass filter mode is:

$$H(s) = \frac{RP}{1/C_s + RP} \quad \text{wherein } s=jw$$

The transfer function for high frequency, i.e. large w is:

$$H(s) = \frac{Cs \cdot RP}{1 + RP \cdot CS}$$

which becomes approximately 1 for high frequencies.

In the low pass frequency mode, the input is to the parallel combination of resistors $R_c$ and $2R_c$ and the output is from capacitor $C_c$. Thus, the transfer function for the low pass filter mode is:

$$H(s) = \frac{1/CS}{RP + 1/Cs} = \frac{1}{RP \cdot Cs + 1}$$

which becomes approximately 1 for low frequencies, i.e. small w.

As previously described, a sample clock is generated which is used for both the symbol clock output to the d.c. restore circuit 260 and control of the same time of the A/D converter in microprocessor 12'. Symbol clock synchronization is established and maintained in microprocessor 12' by the equivalent of an up/down counter employing a step size of 1.6 microseconds (1.5% of a symbol period). An early/late decision and a corresponding phase correction is made with each zero crossing of the baseband signal, thereby maintaining a phase locked symbol clock with the microprocessor internal timer. A/D converter samples of the baseband signal are taken by microprocessor 12' at a time approximately one half a symbol period phase shift from the expected zero crossing times. State detection in the microprocessor is accomplished by the equivalent of three thresholds located between the nominal state values at the appropriate sample instant determined by the symbol clock.

Figure 15:
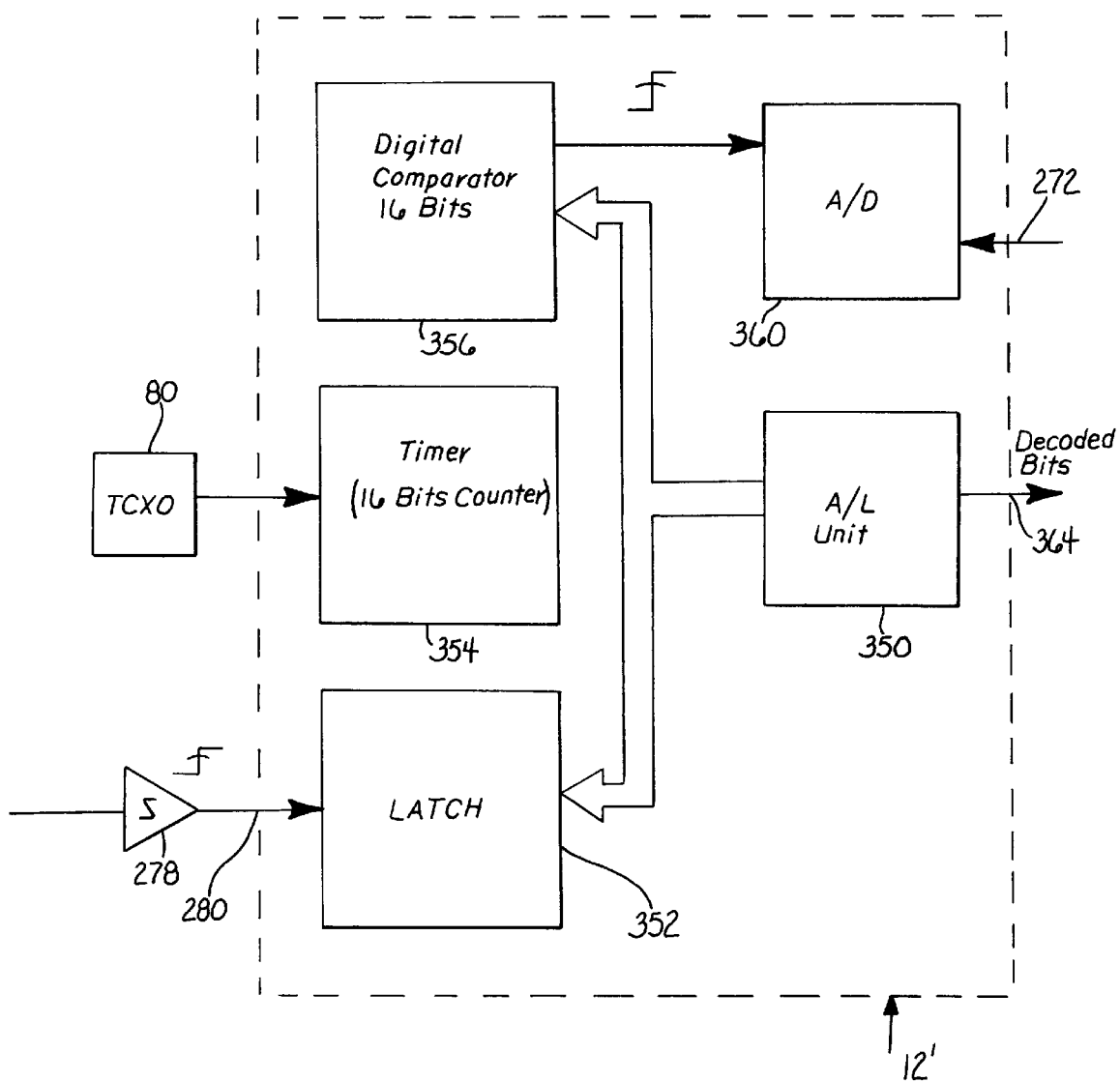
FIG. 15 is a schematic block diagram further including the microprocessor of the radio of FIG. 3A, FIG. 3B and FIG. 3C.

The foregoing is illustrated further by FIG. 15 which shows the internal components of microprocessor 12' involved in the fast clock recovery for symbol detection. The microprocessor arithmetic/logic unit 350 is connected via internal bus structure as shown to a latch 352, a timer 354 in the form of a 16 bit counter and a 16 bit digital comparator or latch 356. The output of zero-crossing detector 278 is applied via microprocessor input 280 to latch 352. Timer 354 operates at the rate of TCXO 80. The output of digital comparator 356 is applied in controlling relation to the microprocessor A/D converter 360 which receives the conditioned baseband signal via microprocessor input 272.

The baseband signal on line 270 has the general form of waveform 64 in FIG. 2 and it is desired to sample the signal on the peaks and troughs thereof for proper symbol detection. The time when the signal crosses zero or a reference is used as an indication of the time when the signal reaches a peak or trough, which is the desired time of sampling. This is compared to a predicted time to determine the required adjustment in the sampling time so as to coincide with a peak or trough. In particular, when the signal crosses zero or a reference, zero crossing detector 278 provides a pulse and the rising edge thereof is input to latch 352 which records the time of the rising edge via the connection to timer 354. A/L unit 350 looks at the time of the event, i.e. the latching, and compares it to a predicted time. Digital comparator 356 stores the time at which A/D converter 360 should sample the baseband signal applied to microprocessor input 272. If the time of latching, i.e. the zero crossing, is earlier than the predicted time, comparator 356 is decremented by the amount of the difference. If the zero crossing and time of latching is the same as the predicted time, nothing is done to comparator 356. If the time of the event, i.e. the zero crossing and operation of latch 352 is later than the predicted time, comparator 356 is incremented by the amount of the difference. As a result, at the proper time, i.e. at the occurrence of a peak or trough in the waveform, digital comparator 356 signals A/D converter 360 to sample the waveform on microprocessor input 272 with the result that A/L unit produces the decoded bits on output line 364.

It is therefore apparent that the present invention accomplishes its intended objects. There is provided a multistate angle modulation process and apparatus for a digital radio which generates a reference signal which transitions smoothly from one state to another. There is also provided a detection process and apparatus for a digital radio which receives a multistate baseband signal wherein there is provided an automatic frequency control in a manner avoiding loss of the low frequency information content of the baseband signal.

While an embodiment of the present invention has been described in detail, that is for the purpose of illustration, not limitation.

What is claimed is:

1. In a digital radio which receives a multistate baseband signal and includes means for detecting the baseband signal:
   a) high pass filter means for removing the low frequency information content of the baseband signal to provide a filtered baseband signal;
   b) means for coupling the filtered baseband signal to said detecting means to provide decoded information signals in digital form;
   c) means for converting the decoded digital information signals to analog information signals;
   d) low pass filter means for filtering the analog information signals to recover the low frequency information content; and
   e) means for adding the low pass filtered analog signal to the baseband signal to provide a conditioned baseband signal for inputing to said detecting means wherein the conditioned baseband signal contains the low frequency information content;

f) so that an automatic frequency control is provided for said radio in a manner avoiding loss of the low frequency information content of the baseband signal.

2. The digital radio according to claim 1 further including means for removing bias from the filtered baseband signal to recover sample clock signal information from the baseband signal.

3. In a digital radio which receives a multistate baseband signal, an automatic frequency control circuit which avoids loss of the low frequency information content of the baseband signal, said circuit comprising:

a) capacitor means;

b) means for coupling the baseband signal to one terminal of said capacitor means;

c) a parallel combination of first and second resistor means connected to the other terminal of said capacitor means at a junction, one of said resistor means having twice the magnitude of the other resistor means;

d) means for coupling said junction to the input of a detecting means in said radio; and e) means for coupling the output of the detecting means to said parallel combination of said resistor means;

f) whereby said capacitor means and said parallel combination of resistor means comprises a complementary filter which acts as a high pass filter relative to the baseband signal coupled to said capacitor means and acts as a low pass filter relative to the output of the detecting means coupled to said parallel combination of resistor means; and g) whereby said high pass filter removes the low frequency information content of the baseband signal and said parallel combination of resistor means acts as a digital to analog converter which along with said low pass filter to restore the low frequency information content to provide a conditioned baseband signal for coupling to the input of said detecting means.

4. The digital radio according to claim 3, further including clamping circuit means connected to said junction for removing bias from the baseband signal to recover sample clock signal information.

* * * * *